(12) United States Patent
Chien

(10) Patent No.: US 8,944,669 B2
(45) Date of Patent: Feb. 3, 2015

(54) LED LIGHT DEVICE INCLUDING LED TRACK MEANS WITH MULTIPLE SURFACES OR A PLURALITY OF TRACK MEANS AND MOVABLE LED-UNIT(S)

(76) Inventor: Tseng-Lu Chien, Walnut, CA (US)

( * ) Notice: Subject to any disclaimer, the term of this patent is extended or adjusted under 35 U.S.C. 154(b) by 0 days.

(21) Appl. No.: 13/367,816

(22) Filed: Feb. 7, 2012

(65) Prior Publication Data

US 2012/0218781 A1  Aug. 30, 2012

(51) Int. Cl.
*H01R 33/00* (2006.01)

(52) U.S. Cl.
USPC .............. 362/642; 362/249.02; 362/800

(58) Field of Classification Search
USPC ............................................. 362/249.02, 800
See application file for complete search history.

(56) References Cited

U.S. PATENT DOCUMENTS 7,712,926 B2 * 5/2010 Matheson ..................... 362/294

* cited by examiner

*Primary Examiner* — Anabel Ton
(74) *Attorney, Agent, or Firm* — Bacon & Thomas, PLLC

(57) ABSTRACT

An LED light device includes a multiple surface LED track, or multiple LED tracks, having built-in movable LED-unit(s) which can be clipped-on, added, or inserted anywhere along the track or from ends of the track.

10 Claims, 13 Drawing Sheets

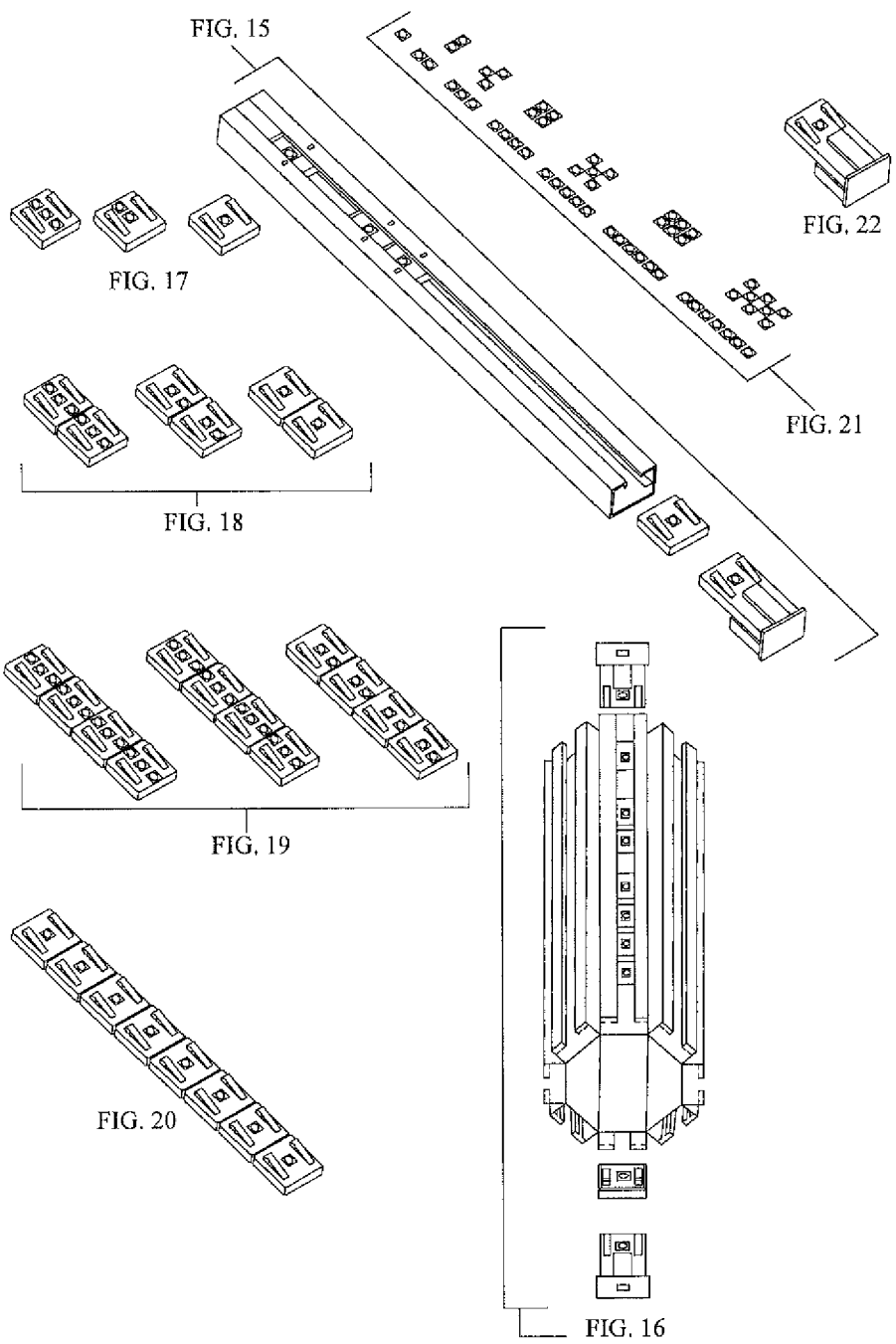

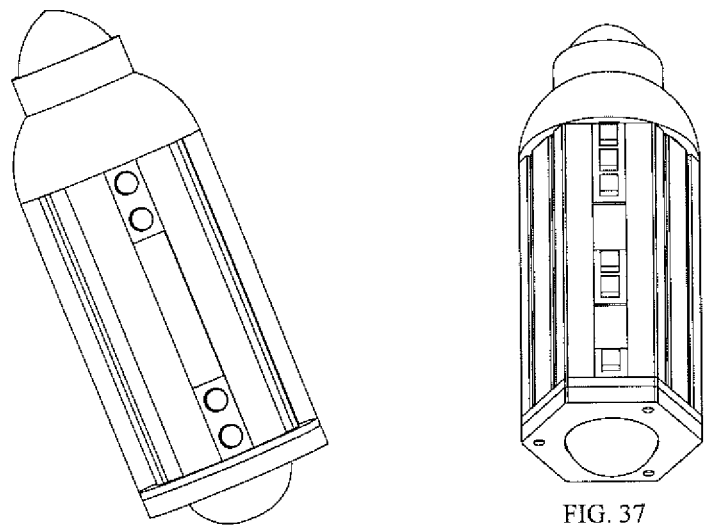
FIG. 37
FIG. 39
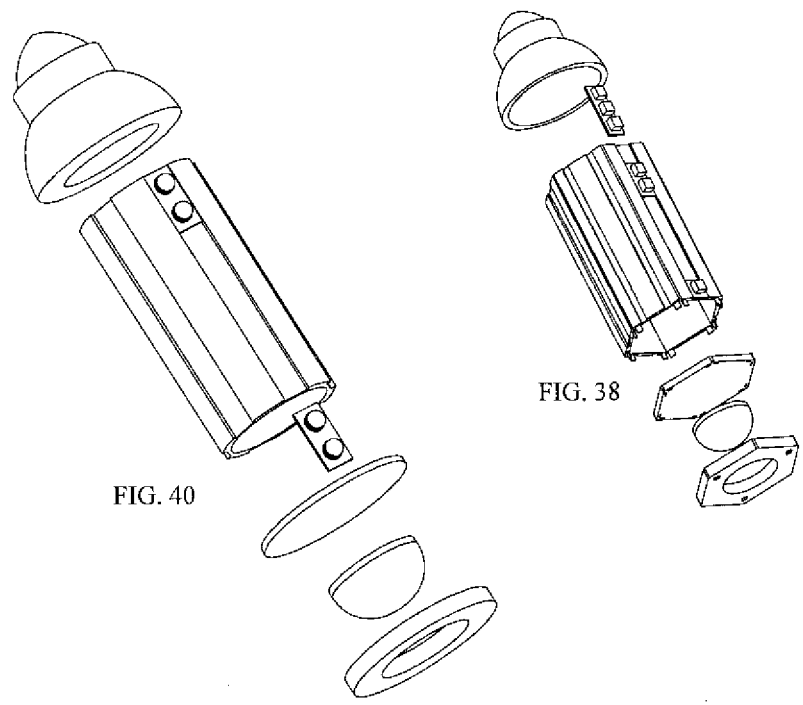
FIG. 38
FIG. 40

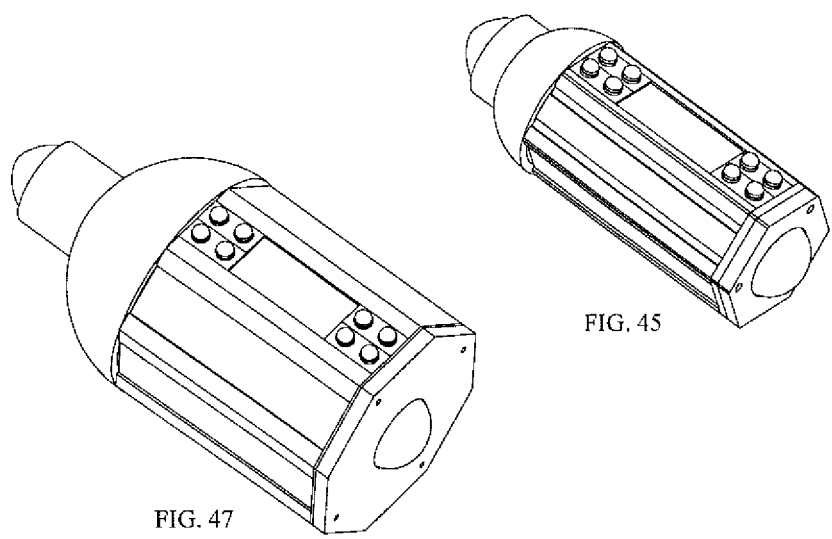
FIG. 45
FIG. 47
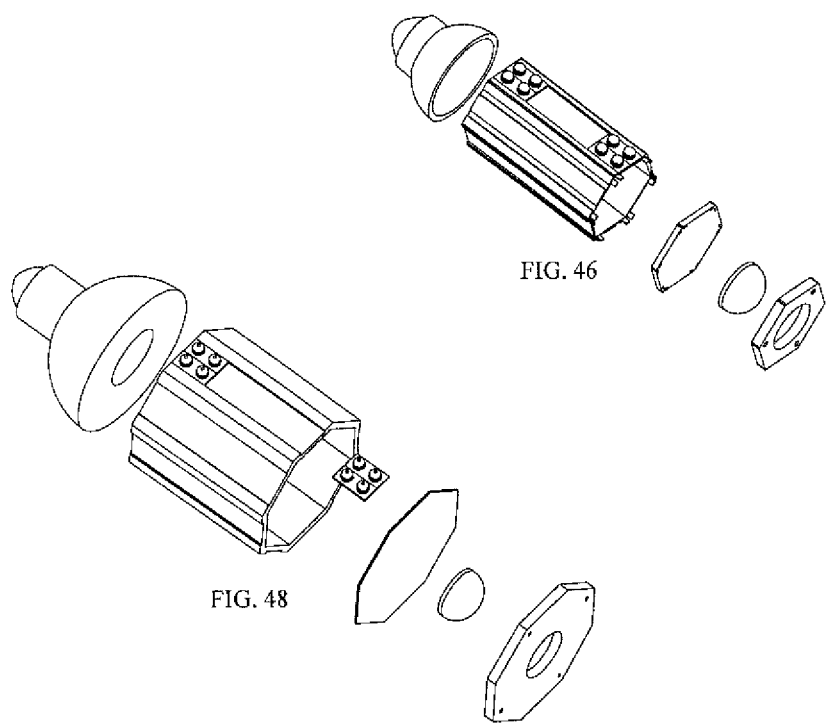
FIG. 46
FIG. 48

LED LIGHT DEVICE INCLUDING LED TRACK MEANS WITH MULTIPLE SURFACES OR A PLURALITY OF TRACK MEANS AND MOVABLE LED-UNIT(S)

BACKGROUND OF THE INVENTION

The current application has subject matter in common with U.S. patent application Ser. No. 13/295,301 (Device Having Built-In Digital Data Means and Powered by Unlimited Power Source of Light Device), Ser. No. 13/296,508 (Device Having Built-In Digital Data Means and Powered by Unlimited power source of LED Bulb), Ser. No. 13/296,460 ("Device Having Built-In Digital Data Means and Powered By Unlimited Power Source of Lamp Holder), Ser. No. 12/951, 501 (Lamp Holder Having Built-In LED Night light," and Ser. No. 12/950,017 (Multiple Surfaces LED Light).

The present application also has subject matter in common with U.S. patent application Ser. Nos. 13/296,508, 13/295, 301, 13/296,469, 13/162,824, 12/938,628, 12/887,700, 12/149,963 (now U.S. Pat. No. 7,722,230), 12/073,095 (now U.S. Pat. No. 7,726,869), 12/073,889, 12/007,076 (now U.S. Pat. No. 7,726,841), 12/003,691 (now U.S. Pat. No. 7,726, 839), and 12/894,865.

Other prior art includes U.S. Patent Publication Nos. and U.S. Pat. No. 7,524,089 (Park), U.S. Pat. No. 6,499,860 (Begemann), U.S. Pat. No. 6,220,722 (Begemann), U.S. Pat. No. 5,924,784 (Chliwnyj et al.), US 2003/0185020 (Stekelenburg), 2006/0146527 (Vanderschuit), and U.S. Pat. No. 6,648,496 (Elghoroury), Although the listed applications and other prior art disclose related subject matter including track means and removable LED-units with built-in LED-elements, however, none discloses an LED light device with more than one track means for receiving removable LED-unit(s).

The current invention provides a universal-type of LED light device which only requires limited tooling to provide a track-means assembly and a corresponding removable LED-unit that can have a variety of different sizes, shapes, brightnesses while being similar in appearance to conventional non-LED light sources, including all kinds of incandescent bulb, photoluminescent (PL) light, and fluorescent light to let people to replace their non-LED light source with the current invention's LED device to achieve power savings and cost savings and thereby save the earth and electric bill amounts at the same time.

The LED light device of the current invention also may incorporate an extendable construction and additional functions as described in one of the inventor's co-pending U.S. patent applications, which may be implemented within the empty space formed by more than two surfaces of the more than one track-means, such as within the space formed by three sides, four sides, five sides, six sides, seven sides, eight sides, or N side track-means surface. This provides a good space to arrange the related parts and accessories for the "extendable construction" and "added function(s)."

The LED light device of the current invention may have a number of removable LED-units, each with a desired size, width, length, diameter, shape, three-dimensional geometric shape, and brightness as required. Each of the LED-units can carry a certain number of LED-elements from 1 to N (N being any number) and each LED-element may have its own wattage, power, light output, light color, light viewing-angle, attachment means, electrodes, and terminals to fit on the LED-unit in a desired arrangement, spacing, matrix, layout, position, and orientation to provide a three-dimensional installation so as to meet any requirement for effects, functions, performance, light show, and light brightness.

The LED light device of the current invention may have a light beam viewing angle from 1 to 360 degrees in to provide three dimensional illumination by a proper arrangement of the removable LED-unit(s) along any one or more pieces of the three-dimensional track-means.

The LED light device of the current invention may also include protect-means in the form of a bulb or device's shell, shade, cover, housing, case, glass, or body, as well as parts such as a stencil, masking, window, opening, cutouts, fixture, box, metal piece, cotton piece, plastic piece, wooden piece, and/or paper piece to seal the LED-unit(s) within and allow lighting effects, functions, and/or performance be seen by a viewer.

The LED light device of the current invention uses the most convenient attachment means to replace, add, reduce, remove, or change the LED-unit(s) anywhere along the track means or from the ends of track means by a clip, insert, twist-and-tighten, slide, push-in, snap, position-and-tighten, or other market available attachment skill, method or device to install and arrange the LED-units with respect to the track means.

The current invention may also provide a ventilation arrangement in which the track-means and the device parts use metal to enable heat to ventilate away from the device.

The current invention may also use the empty space within the multiple surface track-means to install an "extendable construction" and "added functions" to overcome the block-means which block out light beams or electric signal delivery.

It will be appreciated that the current invention may include any features disclosed in the Inventor's above-listed copending or issued patent application's drawings, detailed description, or contents, and such features may still fall within the scope of the current invention, which is not limited to the current drawings, detailed description, and content.

BRIEF DESCRIPTION OF THE DRAWINGS

FIGS. 5 to 30 show various LED-unit and track means features and designs, and also how to install the LED-units clip-on or add-on anywhere along or from ends of the track means.

33 and 34 show details of the construction of a three-surface track means with a related circuit board, lens, optics means, body-parts, narrow-size LED-unit(s), bus-means, track means, lamp base, and base terminal that permit 360 degree twisting.

Figure 35:
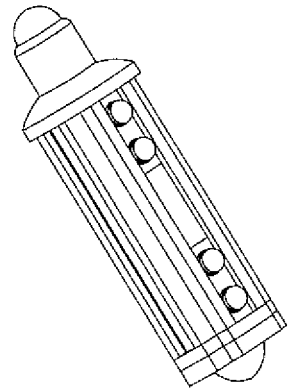
Figure 36:
Figure 41:
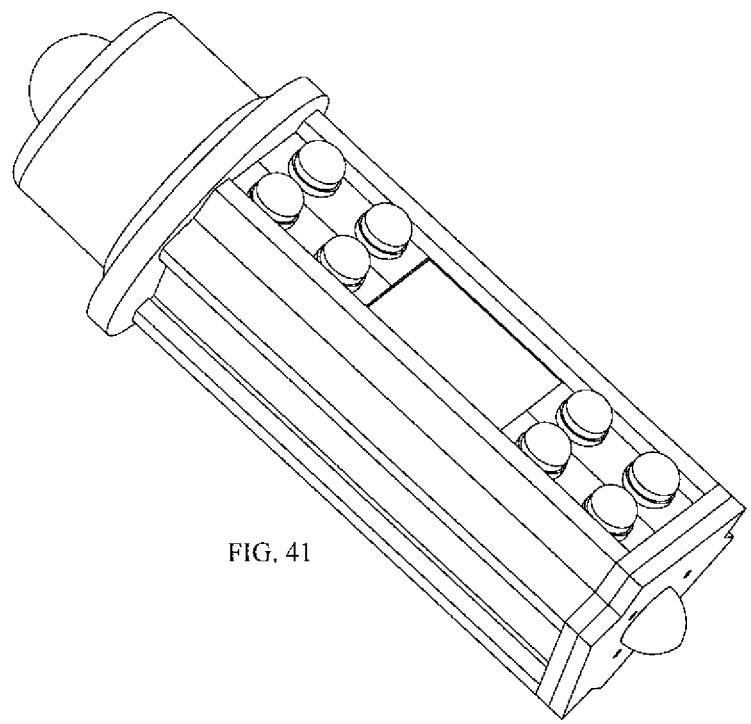
Figure 42:
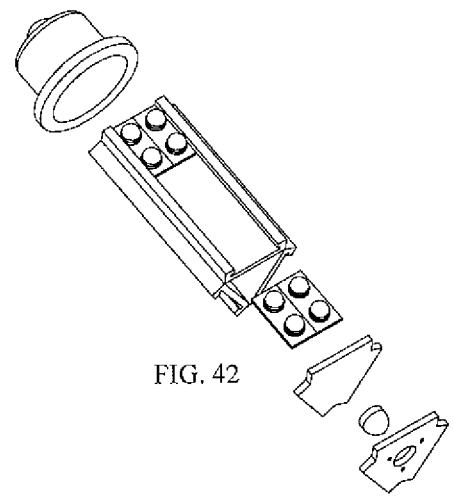
Figure 43:
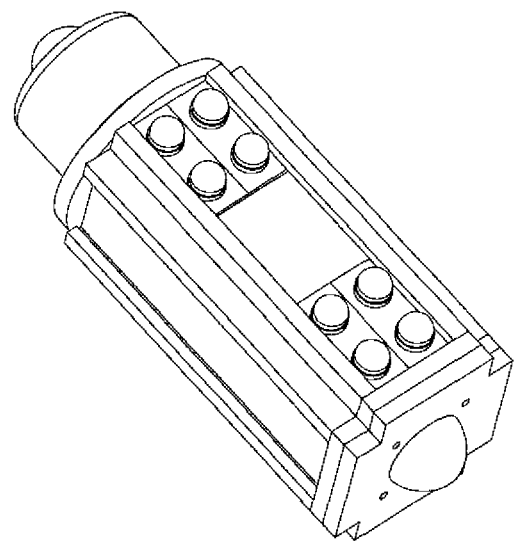
Figure 44:
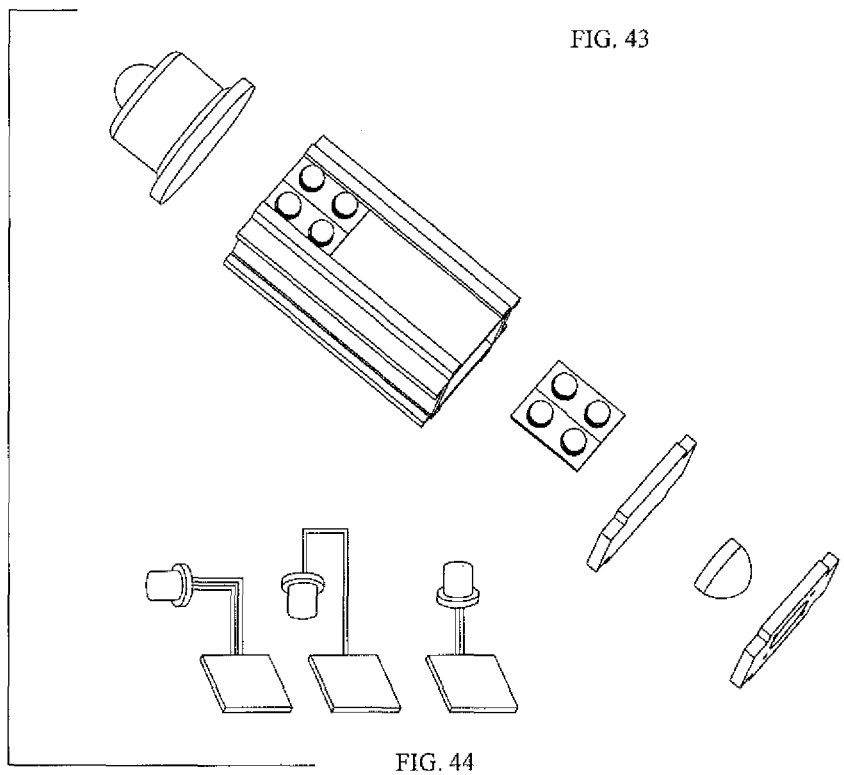
Figure 49:
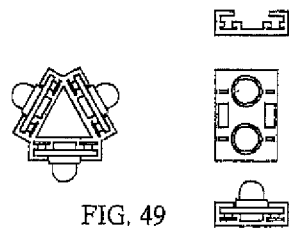
Figure 53:
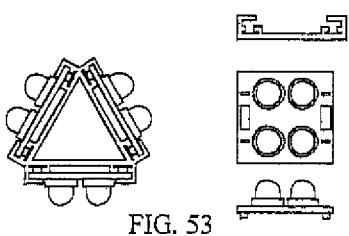
Figure 50:
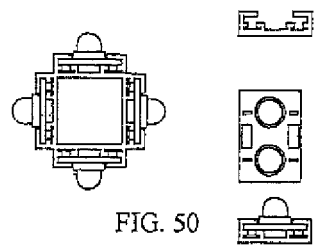
Figure 54:
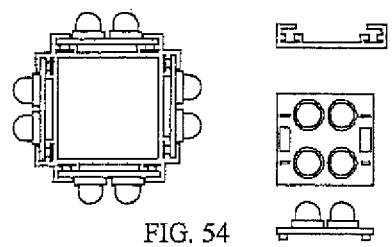
Figure 51:
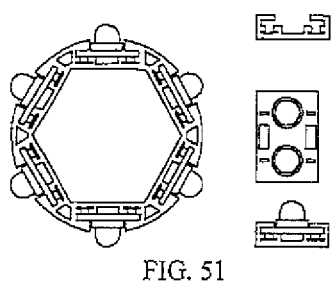
Figure 55:
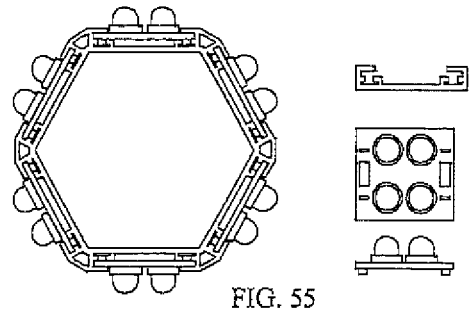
Figure 52:
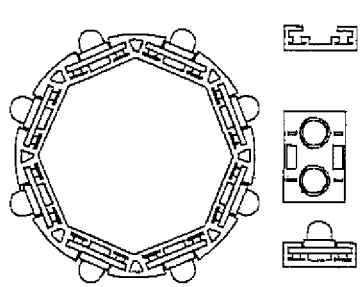
Figure 56:
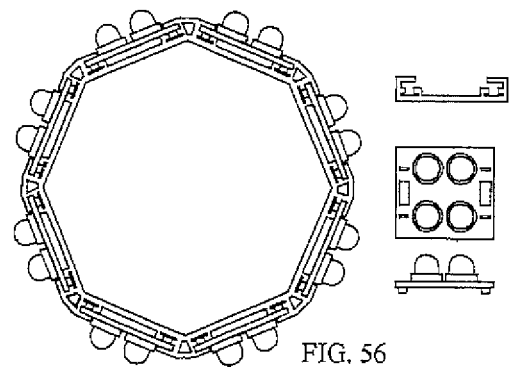

FIGS. 35 and 36 show the construction of a four-surface track means with a related circuit board, lens, optics means, body-parts, narrow-size LED-unit(s), bus-means, track means, lamp base, and base terminals that permit 360 degree twisting FIGS. 39 and 40 shows the construction of an eight-surface track means with related circuit board, lens, optics means, body-parts, narrow-size LED-unit(s), bus-means, track means, lamp base, and base terminals that permit 360 degree twisting.

FIGS. 41 to 48 show details of the construction of respective three, four, six, and eight-surface track means with related circuit board, lens, optics means, body-parts, wider LED-unit(s), bus-means, track means, lamp base, and base terminals with a tolerance for twisting of 360 degrees.

FIGS. 49 to 56 shows details such as a groove size of the track means, an LED-unit size, multiple-surface track-means construction, and the space at the center of the multiple surface track-means that allows installation of an "extendable construction" within which more functions can be added.

DETAILED DESCRIPTION OF THE PREFERRED EMBODIMENTS

The LED lighting device of the current invention has an LED track means with more than one surface or a plurality of track-means with multiple surfaces and built-in movable LED-unit(s) which offer a convenient way for people to provide illumination with a desired brightness, color, illumination area, and illumination direction while saving costs by eliminating LED-elements for unnecessary illumination-areas, thereby reducing power consumption to save energy and save the earth.

The majority of currently marketed LED lighting devices have an excess number of LEDs. For example, a floor lamp may only need to illuminate two outside areas with no need to illuminate the two walls of a corner in which the lamp is situated, but conventional LED bulb does not have a removable or movable LED-units design and so there will be a waste of LEDs on two sides and excess power consumption.

Similarly, in the example of an LED fluorescent tube, there may be no need to provide the whole tube with LED-elements. Only a part of the tube length may need to be provided with LED-elements to illuminate people's working areas. In a production line, the perfect design would be to arrange the LED-elements to extend over the width of a person's head such that the resulting light beam covers the person's shoulder width so that the person can clearly see both hand in a position capable of production or work. Because people may change a working station on a production line, the inner LED-units with built-in LED-elements should be removable or movable from position A to Position B at any time, so the current invention is best for this kind of application. The current invention will save a lot of unnecessary LED-elements and therefore save non-necessary illumination area power consumption to reduce the electric bill, saving money, and energy.

Moreover, the current invention has the advantage of providing removable or movable LED-unit(s) that allow people to change the LED-unit(s) to a desired color assortment for different seasonal, holiday, or birthday lighting effects, which is not possible for any other products in the marketplace. The LED lighting device of the invention can be arranged to provide multiple colors in one device, changing colors, and so forth.

Hence, by providing more than one surface track means with removable or movable LED-unit(s), the invention provides the most practical LED lighting device products ever.

While the LED lighting device of the present invention may incorporate features found in the inventor's prior art or copending U.S. patent applications and issued patents, it will be appreciated that all similar concepts, replaceable parts and accessories, or equivalent-function parts and accessories, may still fall within the current inventions' scope.

Figure 1:
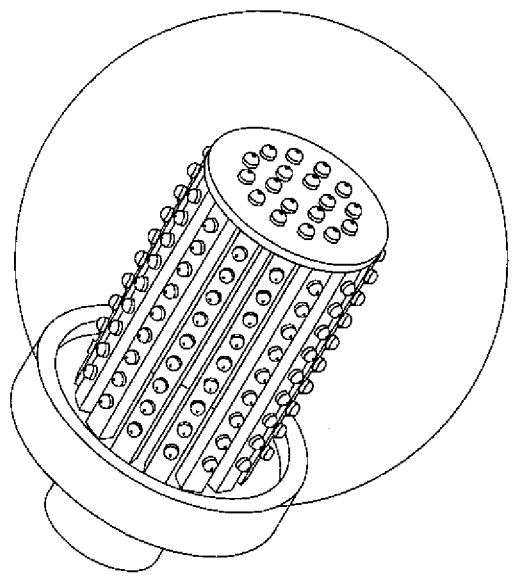
FIGS. 1, 2, and 3 are perspective views of three preferred embodiments of a built-in movable LED unit for an LED device having more than one surface LED track means, in which the LED-units can be moved and installed anywhere along the said track-means or from ends with movable protective-means to seal the LED-unit(s) within and allow light beam been seen by viewers, each of the embodiments having a different number of surfaces and different widths and sizes of the LED-unit(s) for different applications and requirements with respect to shape, size, brightness, bulb shape . . . etc.
Figure 2:
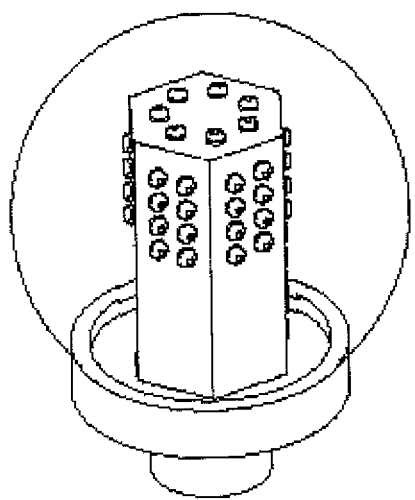
Figure 3:
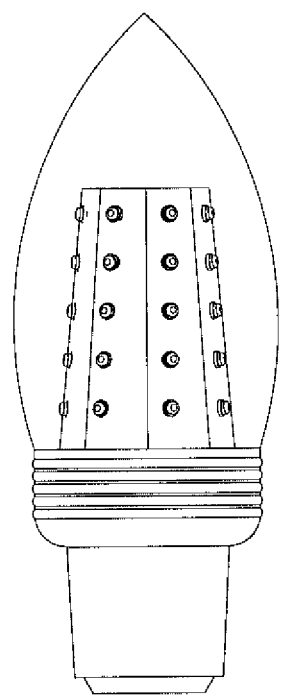

FIGS. 1, 2, and 3 show preferred embodiments of an LED lighting device having more than one surface LED track means and built-in movable LED-unit(s) which can be moved and installed anywhere along the track-means or from ends of the track-means, with movable protective-means to seal the LED-unit(s) within the lighting device and allow light beams to be seen by viewers. Each of the embodiments has track means with a different number of surfaces and with different width and size of the said LED-unit(s) for different applications and requirements for LED-unit shape, size, and brightness, bulb shape, and so forth.

As explained in the text incorporated into the original drawings, the individual track means surfaces or track means within the light devices of FIGS. 1-3 are preferably arranged in a regular geometric shape such a hexahedron for six surfaces or an octahedron for eight surfaces. The individual track means surfaces or track means can nevertheless be made by simple aluminum extrusion tooling, reducing the amount of labor required to form the multiple-sided assembly. As shown in FIG. 2, the LED light device may include LED unit(s) other than those installed in the track means, and the number of LEDs in the LED-units can be any number to meet market requirements. Each of the track means can be installed with a different number, color, size, quality, cost etc., of light units to provide desired lighting effects in desired directions without the need for different tooling.

Figure 4:
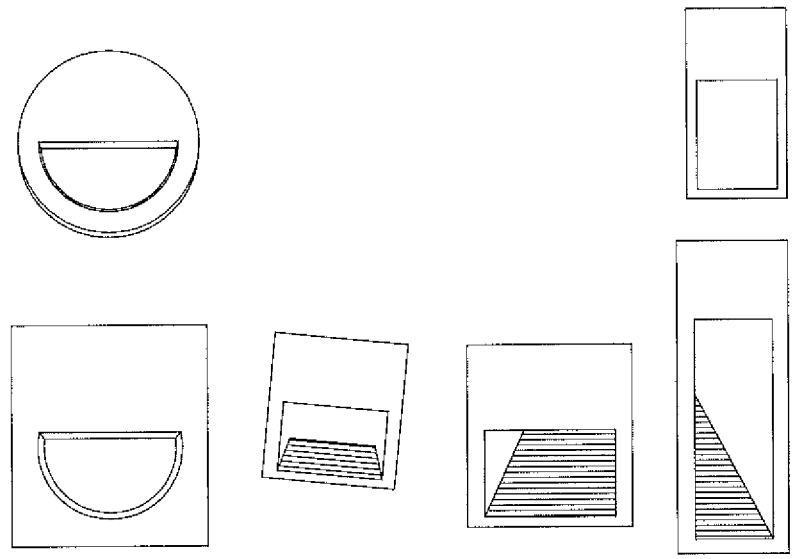
FIG. 4 shows some applications of the embodiments shown in FIGS. 1, 2, and 3 embodiment for indoor or outdoor lighting fixtures.

FIG. 4 shows some applications for the LED lighting devices of FIGS. 1, 2, and 3 for indoor or outdoor lighting fixtures. As explained in original FIG. 4, the cost of the units can easily be varied simply by varying the number of LED units on each of the track means surfaces or track means in each of the lighting devices.

Figure 5:
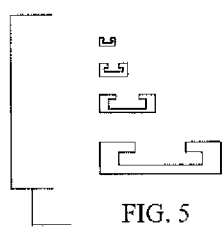
Figure 9:
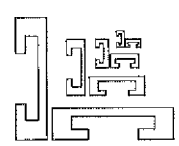
Figure 12:
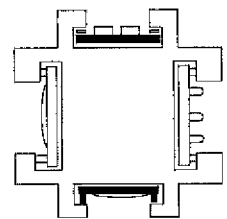
Figure 6:
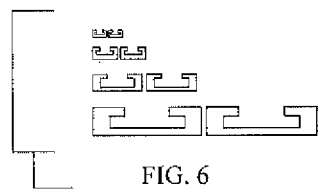
Figure 10:
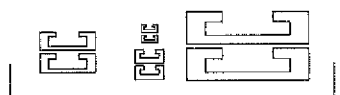
Figure 7:
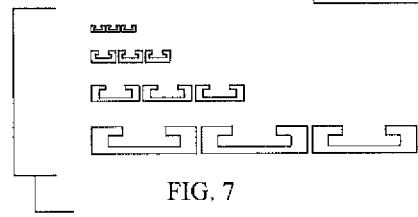
Figure 13:
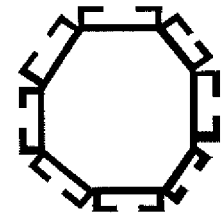
Figure 8:
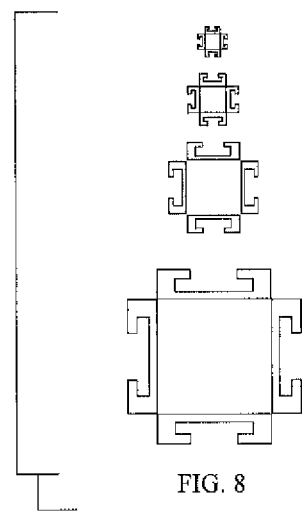
Figure 11:
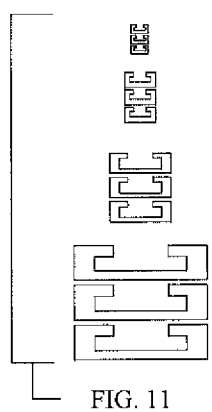

FIGS. 5 to 30 show features and designs for LED-units and track means that may be used in the embodiments of FIGS. 5-7, and in particular how to install LED-units on the track means by clip-on or add-on anywhere along or from ends of the track means. As explained in the text boxes included in the original drawing figures, FIG. 5 shows different sizes of a single track means that may be used in lighting devices of different sizes. FIG. 6 shows two side-by-side track means to provide double the brightness of a single track means because twice as many light-units can be installed, while FIG. 7 shows three side-by-side track means. FIG. 8 shows four track means arranged for 360 degree illumination and with different sizes for different applications, including medium size for portable applications, large size for bed, desk, camping, garden, outdoor, and indoor applications, and extra large size for floor lamps, patios, tables, bed rooms, construction zones, garden, playground, swimming pool, camping and industrial applications. FIG. 9 shows two track means arranged at right angles to provide illumination in only two directions so as to provide a light device that can be placed in a corner without wasting power to illuminate the walls behind the light. FIG. 10 shows overlapping track means, one of which may be installed with lighting units and the others of which may be installed with circuit means and other parts and accessories. FIG. 11 shows details of a four surface arrangement including resilient conductive means and surface mount LEDs sealed by glue. Finally, FIGS. 12 and 13 show octagonal and hexagonal arrangements respectively with eight and six track means surfaces.

Figure 14:
Figure 23:
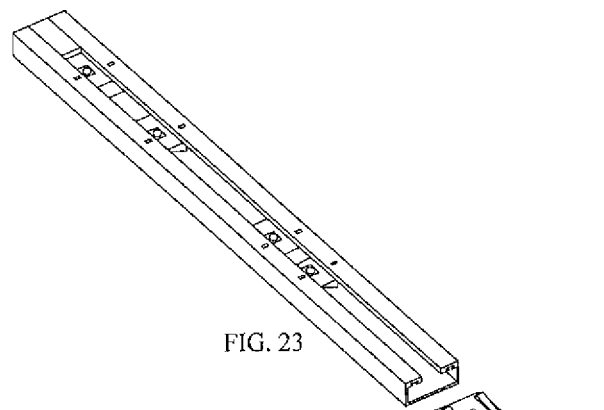
Figure 24:
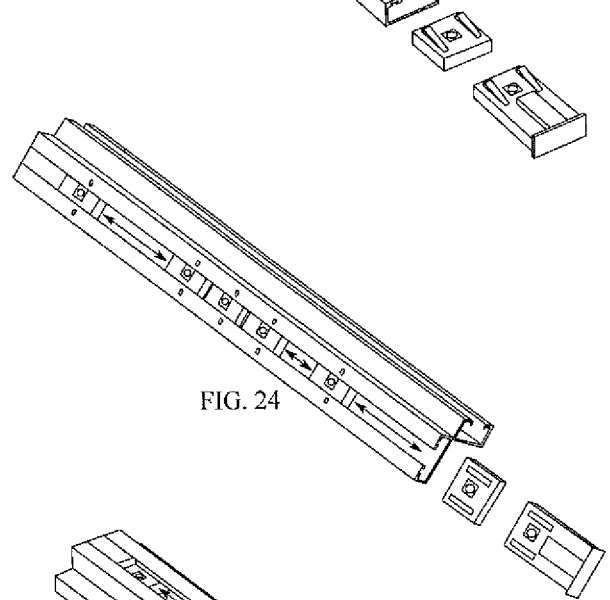
Figure 25:
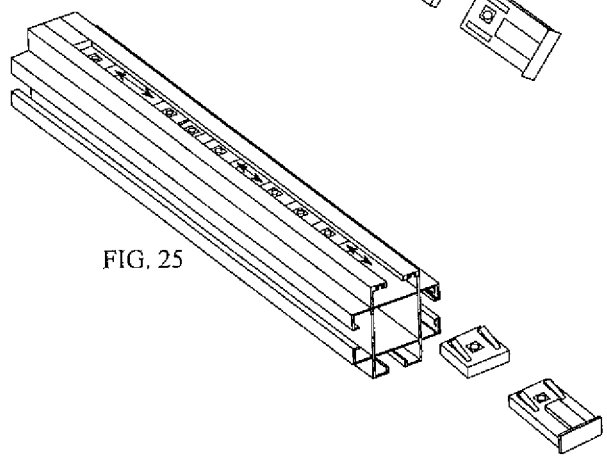
Figure 26:
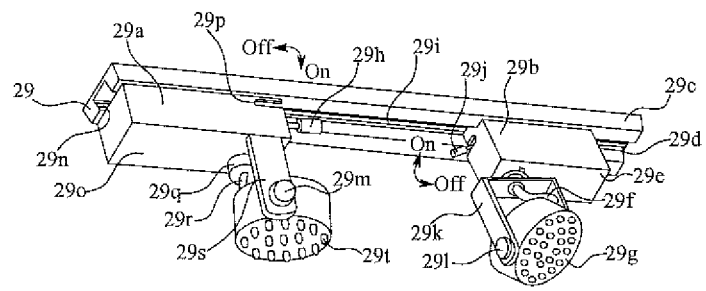
Figures 27, 28:
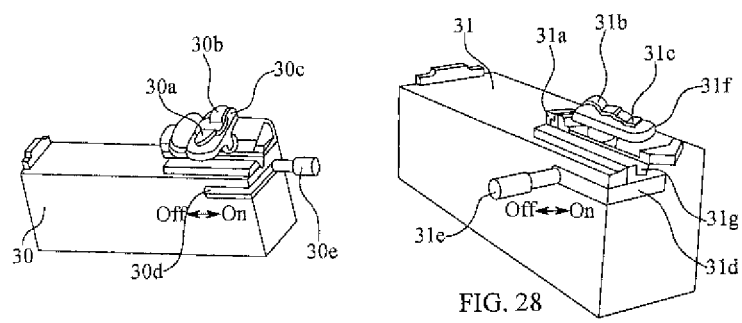
Figures 29, 30:
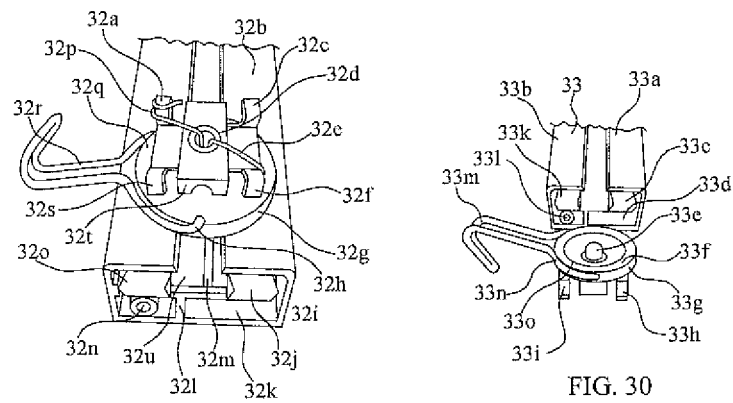
Figure 31:
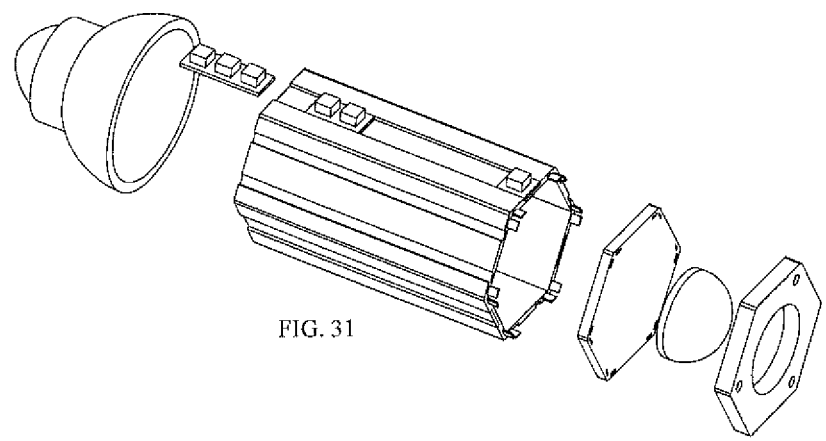
FIGS. 31 and 32 (as well as FIGS. 37 and 38) show details of the construction of a six-surface track means together with a related circuit board, lens, optics means, body-parts, narrow-width LED-unit(s), bus-means, track means, a lamp base, and a base terminal having a tolerance for twisting of 360 degrees as a result of elastic-contact terminals
Figure 32:
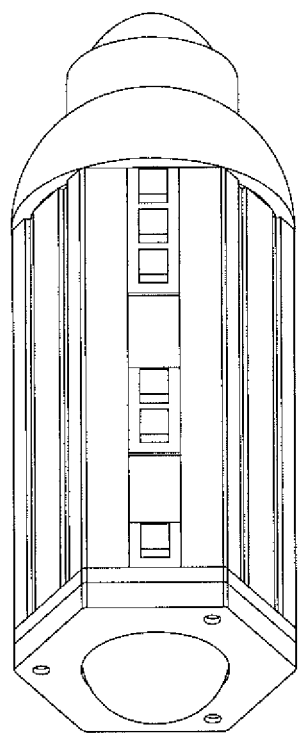

FIG. 15 illustrates the manner in which LED-units may be assembled to an octahedral track means arrangement by insertion at ends of the track means. FIG. 14 shows an individual track means of the type also included in FIG. 15. FIGS. 16-19 show LED-units of different sizes, respective made of one, two, four, and eight individual LEDs. FIG. 20 shows patterns into which individual LEDs may be arranged on the light-units, while FIG. 21 shows an optional LED end-unit which may further includes built-in circuit means, sensor means, switch means, link means, or other electronic parts and accessories. Finally, FIGS. 22 to 24 show further examples of track means arrangements installed with LED-units. FIGS. 26-30, which are taken from the inventor's U.S. Pat. No. 7,722,230, are included solely to illustrate different clip-on arrangements in which the LED-units are inserted from ends of the track means.

FIGS. 31, 32, 37, and 38 show details of the construction of a six-surface track means with related circuit board, lens, optics means, body-parts, narrow-width LED-unit(s), bus-means, track means, lamp base, and base terminals. The base terminals facilitate 360 degree twisting by including elastic-contact terminals (not shown details here. The lamp base can be any type of lamp basis available from the marketplace.

Figure 33:
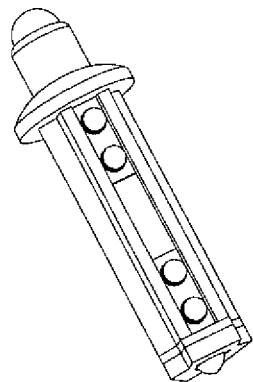
Figure 34:
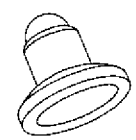

FIGS. 33 and 34 show details of the construction of a three-surface track means with related circuit board, lens, optics means, body-parts, narrow-size LED-unit(s), bus-means, track means, lamp base, and base terminals that permit 360 degree twisting through the use of elastic-contact terminals. The lamp base can again be other type available from the marketplace.

FIGS. 35 and 36 show details of the construction of a four-surface track means with related circuit board, lens, optics means, body-parts, narrow-size LED-unit(s), bus-means, track means, lamp base, and base terminals with a tolerance for twisting of 360 degrees. The lamp base of this embodiment also can be any other type available from the marketplace.

FIGS. 39 and 40 show details of the construction of an eight-surface track means with related circuit board, lens, optics means, body-parts, narrow-size LED-unit(s), bus-means, track means, lamp base, and base terminal 360 degree twisting tolerance. The lamp base also can be any other type available from the marketplace.

FIGS. 41, 42, 43, 44, 45, 46, 47, and 48 show details of the construction of respective three, four, six, and eight-surface track means with related circuit board, lens, optics means, body-parts, wider size LED-unit(s), bus-means, track means, lamp base, and base terminals that can be twisted 360 degrees as a result of elastic-contact terminals. The lamp base can again also be any other type available from the marketplace.

FIGS. 49-56 show details of the groove size and LED-unit size, of various multiple-surface track-means, in which the space at the center of the multiple surface track-means to allows installation of an extendable construction to add more function(s) to the LED light device.

The current invention has other features, as follows:

The LED-unit(s) may be installed on the track-means anywhere along the track-means or from ends of the track means by attachment means selected from a clip, snap, insert, position-and-twist, and magnetic element, so as to enable replacement, removal, assembly, and disassembly of the light unit(s).

At least one LED-element is arranged on an LED-unit to supply light having a desired brightness, color, viewing angle, and range of illumination when the LED-element is supplied with an electric signal by related parts and accessories that may include conductive means, resilient conductive means, position-and-twist means, circuit means, integrated circuit (IC) means (hereafter as IC), switch means, sensor means, remote control means, blue tooth means, motion sensor means, timer means, countdown means, programmable means, short wave means, heat ventilation means, a metal piece, a plastic piece, heat isolation means, optics means, lens means, adjustable focus means, viewing angle adjustment means, electric or electronic parts and accessories, power source means, mechanical means, chemical means, printed conductive means to turn-on and turn-off the said LED-element(s) to provide pre-determined function(s), effect(s), and performance.

At least one removable protective-means is provided to cover the LED-elements means to prevent people to directly touch while the protective-means in normal condition or in use. The removable protective-means can be moveable and is arranged to be attached by a clip, snap, insert, position-and-twist arrangement, and magnetic element, to replace, reduce the number of, remove, assemble, and disassemble the LED-unit(s). The removable protective-means can also be assembled to other body parts by assembly-means that may include a hinge, screw, catch, screw-and-twist arrangement, snap, push-tighten arrangement, Velcro™, loop-n-hook, double-sided tape, or any other skill, method, or assembly means available from the marketplace.

The said more than one surface track-means can include a plurality of track-means joined together or one piece track-means having multiple of surface.

The respective surfaces of the track-means may have any desired relation to other surfaces or other individual track-means to form a geometric three-dimensional arrangement that provides the best illumination results.

The body parts may be made out of any combination of metal pieces, plastic pieces, transparent pieces, translucent pieces, heat ventilation materials, heat isolation materials, and conductive materials to meet safety requirements.

Electric connection of a power source to the LED light device may be through any of a lamp base, screw base, bayonet base, pin base, position-and-twist base, wire-and-plug, prong means, cigarette plug means, connector(s), quickly connection means, and male and female connectors to obtain power from a home electricity power source, direct current power source, energy storage power source, solar power source, chemical power source or other power source available from the marketplace.

The movable protective-means may be in the form of a bulb shell, bulb shade, bulb cover, bulb case, lamp cover, tube cover, photo-luminescent (PL) lamp shell, or any other light source' shell, cover, or case.

The LED light device of the invention may include heat ventilation means made up of a material having heat ventilation properties or a mechanical device, chemical means, a fan, coolant, water, wind, or aluminum alloy material.

The LED light device may have an extendable construction to overcome the effect of blocking-means which block out the light beam or electric signal delivery.

The LED light device may take the form of an LED bulb, LED fluorescent tube, LED light source, lamp holder having a built-in LED, lamp holder adaptor having a built-in LED. LED light bar, LED tubular light device, LED lamp, LED floor light, LED indoor light, LED outdoor light. LED traffic light, LED warning light, LED beacon light, LED rotating light, LED emergency light, LED power fail light, LED night light, LED power fail light, LED flash light, or other LED light device available from the marketplace.

The removable LED-unit(s) can may include a built-in circuit, plastic housing sealing, a position-and-twist tight device, elastic/resilient conductive means, electric connection means, a source of self-power when removed from the track-means, built-in other functions, a dot-matrix or array of LED-elements, adjustable angle features, focus adjustment for the LED-unit(s), an optics lens, reflectors, bendable hose, a lamp shade, and/or a lamp cover.

The invention claimed is:

1. An LED lighting device, comprising:
at least one LED track means for removably installing movable LED-units anywhere along a length of said at least one LED track means, wherein said at least one LED track means includes an LED track means with a plurality of surfaces or a plurality of LED track means, wherein the plurality of surfaces or the plurality of LED track means face in different directions, and wherein different said LED-units or different numbers of said LED-units are installed on different said surfaces or track means to provide different illumination effects in said different directions;
at least one LED element arranged on each said LED-unit to emit light having a desired brightness, color, viewing angle, and range of illumination when a respective said LED-unit is installed on one of said plurality of surfaces or plurality of track means, said at least one LED element being supplied with electricity by parts and accessories included in the respective said LED-unit, said parts and accessories being selected from a position-and-twist connector, circuitry, an integrated circuit, at least one switch, said LED-unit further including at least one of a a metal piece, a plastic piece, a heat insulator, optical elements, at least one lens, an adjustable focus mechanism, means for supplying power to the LED-unit when disconnected from the track means, and means for turning on and off the LED element to provide predetermined lighting functions, effects, and performance;
at least one removable protective means arranged to be assembled to at least one body part for enclosing said track means and said LED-units to prevent the at least one LED element from being touched during use, said removable protective means being removable to permit said LED-units to be installed on and removed from selected said plurality of surfaces or plurality of track means, and said protective means being assembled to said at least one body part by assembly means selected from a hinge, screw, catch, screw-and-twist coupling, snap, push-to-tighten coupler, Velcro™, loop-and-hook fastener, double-sided tape, and fastening element; and
electric delivery means for delivering electrical power from an external power source or an internal direct current or energy storage power source to said track means and to said parts and accessories included in a respective said at least one LED light-unit installed on the track means, said electric deliver delivery means including at least one of a lamp base; a screw base; a bayonet base; a pin base; a position-and-twist base; a wire-and-plug arrangement; prongs; a cigarette lighter plug; male, female, or quick-disconnect connectors; and direct current or energy storage power source connections.

2. An LED light device as claimed in claim 1, wherein said different LED-units on said different surfaces or different track means provide selected color, brightnesses, functions, or light effects in different directions in three-dimensional space.

3. An LED light device as claimed in claim 1, wherein said removable protective means forms one of a bulb shell, bulb shade, bulb cover, bulb case, lamp cover, tube cover, and photo-luminescent (PL) lamp shell.

4. An LED light device as claimed in claim 1, wherein said LED light device further comprises a heat ventilation element made of a material having heat ventilation properties or that includes a heat removal device selected from a mechanical device, coolant carrying device, fan, chemical cooling arrangement, and water or wind cooling arrangement.

5. An LED light device as claimed in claim 1, wherein said track means includes said plurality of track means assembled to form a three-dimensional structure to provide illumination in different selected directions.

6. An LED light device as claimed in claim 1, wherein the LED light device is extendable to avoid areas from which light emission is blocked.

7. An LED light device as claimed in claim 1, wherein the LED light device is one of an LED bulb, LED fluorescent tube, LED light source, lamp holder with built-in LED, lamp holder adaptor with built-in LED, LED light bar, LED tubular light device, LED lamp, LED floor light, LED indoor light, LED outdoor light, LED traffic light, LED warning light, LED beacon light, LED rotating light, LED emergency light, LED power fail light, LED night light, LED power fail light, and LED flashlight.

8. An LED light device as claimed in claim 1, wherein said at least one LED unit includes at least one of a built-in circuit, sealed plastic housing, position-and-twist coupler, internal power source for supplying power when removed from the track means, array of said LED elements, adjustable angle or focus mechanism, lens, elastic conductive terminal, and lamp shade or cover.

9. An LED light device as claimed in claim 1, wherein said plurality of track means forms a polyhedral structure.

10. An LED light device as claimed in claim 1, wherein said at least one LED-unit is inserted into said track means from an end of said track means, and further comprising an LED unit that includes an end cover for said track means.

* * * * *